United States Patent [19]

Paskert

[11] 4,289,058
[45] Sep. 15, 1981

[54] SHEET METAL NAIL

[75] Inventor: Joseph H. Paskert, Lakewood, Ohio

[73] Assignee: Eaton Corporation, Cleveland, Ohio

[21] Appl. No.: 6,409

[22] Filed: Jan. 25, 1979

[51] Int. Cl.³ .......................... E01B 9/12; F16B 15/06
[52] U.S. Cl. ..................................... 411/451; 411/349; 411/477; 411/480
[58] Field of Search ...................... 85/5 P, 9 R, 11, 28, 85/29, 53, 55; 24/221 R

[56] References Cited

U.S. PATENT DOCUMENTS

| Re. 9,440 | 11/1880 | Judd | 85/28 UX |
|---|---|---|---|
| 306,874 | 10/1884 | Thatcher | 85/9 R X |
| 1,783,391 | 12/1930 | Schorr et al. | 85/11 X |
| 1,815,098 | 7/1931 | Earhart | 85/5 P X |
| 2,202,896 | 6/1940 | Buchner et al. | 85/11 X |
| 2,427,392 | 9/1947 | Eckel | 85/28 |
| 2,697,857 | 12/1954 | Eckel | 85/11 X |
| 2,929,603 | 3/1960 | Stewart | 24/221 R X |
| 3,088,361 | 5/1963 | Hallock | 85/28 |
| 3,466,967 | 9/1969 | Hallock | 85/11 |
| 3,710,672 | 1/1973 | Hallock | 85/11 |
| 3,798,710 | 3/1974 | Tinnerman | 24/73 B |
| 3,983,779 | 10/1976 | Dimas | 85/21 |

*Primary Examiner*—Thomas J. Holko
*Attorney, Agent, or Firm*—R. J. McCloskey; H. D. Gordon

[57] ABSTRACT

A two-piece sheet metal nail (10) comprising a one-piece shank portion (12) and a one-piece head portion (14) which may be quickly and manually assembled without the requirement for specialized tools is provided. The shank portion (12) includes a pair of oppositely extending wing members (32 and 34) adapted to cooperate with a pair of tabs (46 and 48) provided on the head portion (14) to self-lockingly assemble the shank portion (12) to the head portion (14).

21 Claims, 12 Drawing Figures

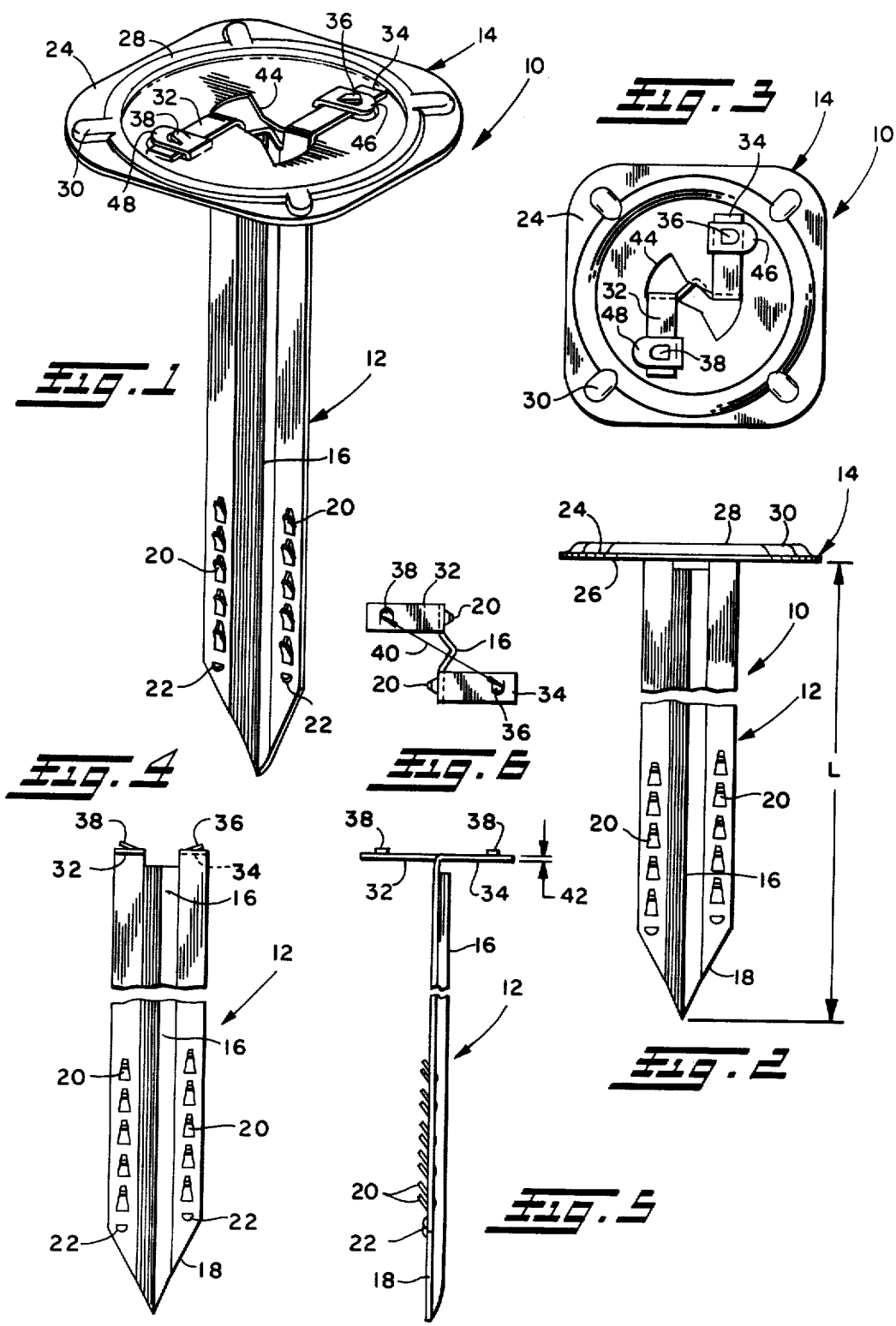

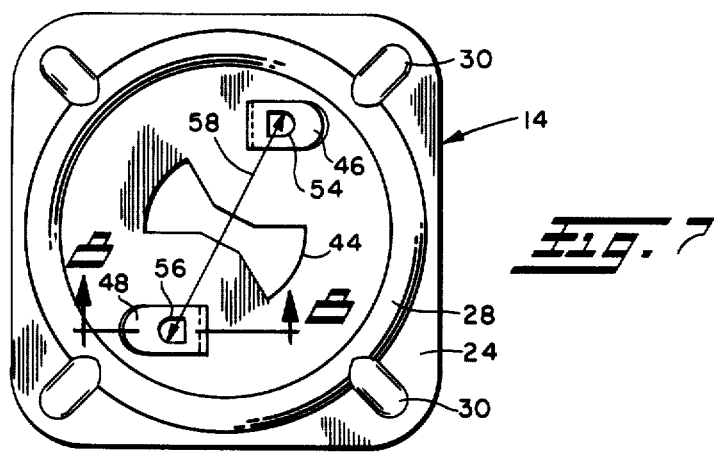
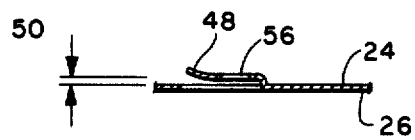
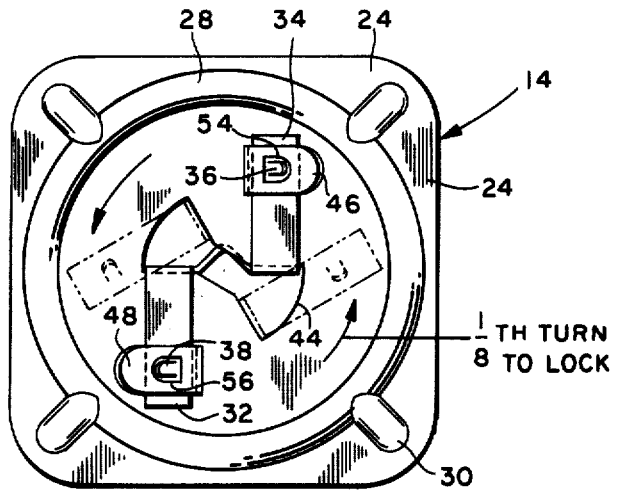

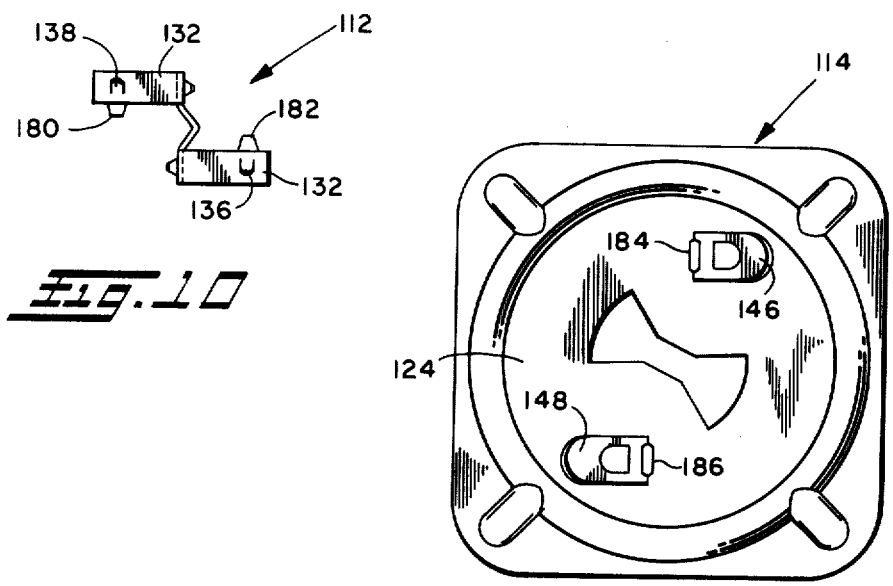
Fig. 10
Fig. 11
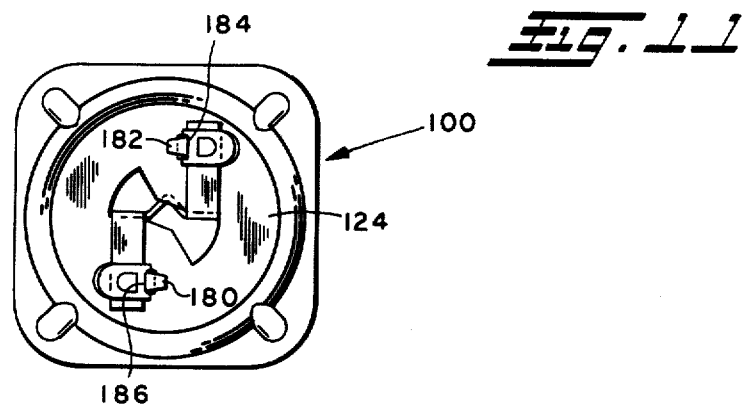
Fig. 12

SHEET METAL NAIL

BACKGROUND OF THE INVENTION

1. Field of the Invention

The present invention relates to a two-piece sheet metal nail assembly and in particular relates to a two-piece sheet metal nail comprising a one-piece stamped shank portion adapted to be driven into and retained in a structure and a one-piece stamped head portion adapted to be quickly and easily assembled to the shank portion.

2. Description of the Prior Art

Sheet metal nails for securing panels or the like to a support structure are well-known in the prior art. In particular, such sheet metal nails are well known for attaching slabs of insulation or the like to metallic roof decks or the like.

One type of prior art sheet metal nail is a one-piece structure utilizing an integral head and shank portion. Such nails are extremely desirable for many applications wherein the required surface area of the head portion and/or the axial length of the shank portion did not exceed certain limits. Examples of such nails may be seen by reference to U.S. Pat. No. 3,710,672, issued Jan. 16, 1973, and U.S. Pat. No. 3,983,779, issued Oct. 5, 1976. However, when a greater axial length of shank portion or a greater surface area of head portion was required, such one-piece nails were not totally satisfactory as extremely large capacity stamping presses were required to produce same, the stamping procedures to produce same were unduly difficult, and/or expensive, and/or the nails were not easily and/or compactly shipped.

The prior art has also included multiple-piece sheet metal nails which were useful when an especially large axial length of shank portion and/or surface area of head portion was required. An example of such a multiple-piece nail may be seen by reference to U.S. Pat. No. 3,088,361, issued May 7, 1963. The prior art multiple-piece nails were not totally satisfactory as they required preassembly as by a welding or fabrication operation, they required an unduly large shipping container, they were difficult to properly assemble in the work place, and/or required specialized assembly tools.

SUMMARY OF THE INVENTION

In accordance with the present invention, many of the drawbacks of the prior art have been minimized or overcome to the extent that a two-piece, stamped sheet metal nail which may be compactly shipped and quickly, manually, and if required, self-lockingly assembled without the use of special tools is provided. The above is accomplished by providing a two-piece sheet metal nail comprising a one-piece sheet metal shank portion and a one-piece sheet metal head portion. The shank portion comprises an elongated body preferably pointed at the free end thereof and provided with a pair of oppositely extending wing members at the other end thereof. The wing members preferably extend at substantially right angles from the longitudinal axis of the shank and are each provided with projections extending therefrom. The head portion is in the form of a substantially flat plate having an upper surface and a lower surface and a generally, centrally located aperture or opening therethrough. The generally centrally located opening is of sufficient size to allow passage of and at least limited rotation of the elongated body of the shank portion but will prevent passage of the wing members therethrough. A pair of tabs sheared from the head portion have at least a portion thereof extending generally parallel to and spaced from the upper surface of the head portion. The tabs are preferably spaced from the upper surface of the head portion by a distance generally equal to or slightly less than the thickness of the wing members. The tabs each have an aperture therethrough which is spaced apart by a distance generally equal to the distance between the projections on the wing members. The wing members are adapted to be retained between the tabs and the upper surface and the projections are designed to resiliently snap into the apertures in the tabs when the wing members are forced under the tabs to self-lockingly assemble the head portion to the shank portion.

In operation, the shank portion is inserted from the upper surface through the opening in the head portion, free end first, until the wing members engage the upper surface of the head portion. The shank portion is then rotated relative to the head portion forcing the wing members resiliently under the tabs until the projections on the wing members register with and resiliently snap into the apertures in the wing members completing assembly of the two-piece nail of the present invention.

The two-piece nail of the present invention is thus easily and compactly shipped in a disassembled condition and is easily and manually self-retainingly assembleable in the work place without the need for specialized tools or the like.

Accordingly, it is an object of the present invention to provide a new and improved sheet metal nail.

It is another object of the present invention to provide a new and improved sheet metal nail comprising two one-piece stampings which may be easily and manually assembled at the work place without the requirement of utilizing special tools.

These and other objects and advantages of the present invention will become apparent from a reading of the detailed description of the preferred embodiment taken in view of the accompanying drawings.

BRIEF DESCRIPTION OF THE DRAWINGS

FIG. 1 is a perspective view of the two-piece nail of the present invention in the fully assembled condition.

FIG. 2 is a front elevation of the two-piece nail illustrated in FIG. 1.

FIG. 3 is a top view of the two-piece nail illustrated in FIG. 1.

FIG. 4 is a front elevation of the shank portion of the present invention.

FIG. 5 is a side view of the shank portion of the present invention.

FIG. 6 is a top view of the shank portion of the present invention.

FIG. 7 is a top view of the head portion of the present invention.

FIG. 8 is a fragmentary front view of part of the plate portion of the present invention as illustrated in FIG. 7.

FIG. 9 is a top view showing the assembly procedure for assembling the shank portion to the head portion.

FIG. 10 is a top view of the shank portion of an alternate embodiment of the present invention.

FIG. 11 is a top view of the head portion of the embodiment of FIG. 10.

FIG. 12 is a top view of the two-piece nail assembly of the embodiment of FIG. 10.

DESCRIPTION OF THE PREFERRED EMBODIMENT

Certain terminology will be used in the following description for convenience and reference only and will not be limiting. The words "upwardly", "downwardly", "upper", "lower", "inwardly", "outwardly", "clockwise" and "counterclockwise" will designate directions in the drawings to which reference is made. Said terminology will include the words above specifically mentioned, derivatives thereof, and words of similar import.

The two-piece nail 10 of the present invention may be seen in the assembled condition by reference to FIGS. 1 through 3. The two-piece nail 10 comprises a one-piece shank portion 12 and a one-piece head portion 14, each of which are adapted to be shipped separately and then manually, self-lockingly assembled at the work place. The shank portion 12 may be of a convenient, axial length L and shank portions of various axial lengths may be provided for assembly to a standard head portion 14. Conversely, head portion 14 may be of a convenient shape and/or surface area and head portions of various shapes and/or surface areas may be provided for assembly to a standard length shank portion or to shank portions of various axial lengths.

The shank portion 12 comprises a generally elongated body which may be generally arcuate in cross sectional shape or may be substantially flat with an axially extending rib 16 pressed therein to provide additional rigidity, as is well known in the prior art. The free end of the shank portion, or the leading end, is provided with a generally V-shaped edge 18 for piercing the material into which the nail is to be driven. Of course, any type of a pointed leading edge is sufficient for this purpose. A plurality of locking members or tangs 20 are provided in the shank at different distances from the head portion 14. The locking members are arranged in two aligned rows running parallel to the axis of the shank portion and provision of same at various axial spacings from the head portion allows the nail 10 to be utilized with insulation materials and/or deck materials of various thicknesses. The locking members 20 illustrated are of the cam locking type comprising upwardly and outwardly extending members formed from inverted V- or U-shaped slots in the shank as is well known in the art and as may be seen in greater detail by reference to U.S. Pat. No. 3,983,779, assigned to the assignee of this application, and hereby incorporated by reference. It is understood that various types and numbers of locking members are utilized in nails of this type and that such locking members are intended to fall within the scope of the present invention. Preferably, a pair of protuberances or protrusions 22 are formed in the shank adjacent the leading edge 18 thereof and are aligned with the rows of locking members 20. The protrusions 22 extend from the same surface of the shank portion as do the locking members and are aligned therewith.

The head portion 14 is in the form of a generally flat plate defining an upper surface 24 and a lower surface 26. The surfaces 24 and 26 of the head portion 14 may be substantially flat, or preferably, may be formed with rib members such as annular rib member 28 and generally radially extending rib members 30 for additional rigidity. In operation, as is well known in the art, assuming the nail 10 of the present invention is utilized to attach a layer of insulation to a roofing deck, the leading edge 18 of the nail is placed against the insulation material and then the head portion 14 is impacted by an impacting tool, such as a hammer, causing the shank of the nail to penetrate the insulation material and the roofing deck until the lower surface 26 of the head portion 14 contacts the insulation material and one of the locking members 20 will engage the underside of the roofing deck. The shank portion 12 and the head portion 14 are of a sheet metal, such as spring steel, and are of a gauge sufficient to meet the requirement of the nail 10.

The one-piece stamped shank portion 12 may be seen in greater detail by reference to FIGS. 4 through 6. Extending generally transversely outwardly and in opposite directions from the end of the shank portion opposite the leading end 18 are a pair of generally coplanar wing members 32 and 34 formed from bent over extensions of the shank portions 12. The wing members 32 and 34 extend from opposite sides of the shank portion 12. Each wing member, 32 and 34, has a projection, 36 and 38, are separated by a distance 40 measured in the plane defined by the upper surface of the wings. The projections may be of a dimple shape or, preferably, may be generally chevron shaped slots sheared from the wing members. The wing members 32 and 34 are of a thickness 42 which is generally equal to the thickness of the stock from which the shank portion 12 is formed. A gusset may be formed between the wing members and the longitudinally extending section of the shank portion.

The one-piece head portion 14 may be seen in greater detail by reference to FIGS. 7 and 8. The head portion 14 is a generally flat plate having an upper surface 24 and a lower surface 26. The head portion may be provided with ribs such as ribs 28 and 30 for added rigidity as is well known in the art. The head portion 14 is provided with a generally centrally located aperture or opening 44 which is preferably of a generally hour glass shape. The opening 44 is sized to allow passage of the axially extending section of the shank portion 12 but to prevent passage of the wing members, 32 and 34, and to allow at least limited rotation of the shank portion 12 relative to the head portion 14 when the shank portion 12 is inserted into the aperture 44. Located on diametrically opposite sides of opening 44 are two tabs 46 and 48 which are sheared out of the body of the head portion 14 and extend generally parallel to the upper surface 24. The tabs 46 and 48 are spaced from the upper surface 24 by a distance 50 which is generally equal to or slightly less than the thickness 42 of the wing members. The free ends of tabs 46 and 48 extend in opposite directions. The free ends of the tabs may be provided with generally upwardly extending lead-in ramps 52. The tabs 46 and 48 are each provided with a generally chevron shaped aperture, 54 and 56, respectively, which are separated by a distance 58 generally equal to the distance 40 separating the projections 36 and 38 on the wing members. The apertures, 54 and 56, are generally slightly larger than and of the same general shape as the projections 36 and 38.

As will be appreciated, the projections 36 and 38 and the apertures 54 and 56 may be of any convenient size and shape and the apertures may be formed in the wing members with the projections formed in the tabs if desired.

Assembly of the shank portion 12 to the head portion 14 to form the two-piece nail 10 of the present invention may be appreciated by reference to FIG. 9 taken in connection with the following description. The shank portion 12 is inserted into and through the aperture 44 of the head portion 14, leading edge 18 first, until the wing members, 32 and 34, of the shank portion 12 engage the upper surface 24 of the head portion 14 as may be seen by reference to the dotted line illustration in FIG. 9. The shank 12 is then rotated in a counterclockwise direction relative to the head portion 14 causing the wing members 32 and 34 to engage the lead-in ramps 52 of the free ends of the tabs, 46 and 48, causing the tabs to deflect resiliently upwardly as the projections 36 and 38 on the wing members pass between the tabs and the upper surface 24. As the relative rotation continues, the apertures 54 and 56 on the tab members 46 and 48 will align with the projections 36 and 38 on the wing members and the tabs will snap resiliently downwardly entrapping the projections in the apertures to self-lockingly assemble the shank portion 12 to the head portion 14. This position is illustrated in the solid line configuration of FIG. 9. Undesired removal of the shank portion 12 from the head portion 14 will be resisted as the free ends of the chevron shaped projections will engage the edges of the apertures to self-lockingly prevent a clockwise rotation of the shank portion 12 relative to the head portion 14 from the position shown in the solid lines in FIG. 9. Should it be desired that the head portion 14 be easily removable from the shank portion 12, the projections may be in the form of generally continuous dimples and the apertures of a generally annular form or the projections may be eliminated.

An alternate embodiment 100 of the present invention may be seen by reference to FIGS. 10–12. The alternate embodiment 100 is similar to assembly 10 illustrated in FIGS. 1–9 and similar elements will be designated with similar reference numerals with a "1" prefixed thereto.

The one-piece stamped shank portion 112 of embodiment 100 is illustrated in FIG. 10 and is substantially identical to shank portion 12 discussed above except for the addition of finger members 180 and 182 extending from wing members 132 and 134 respectively. The finger members 180 and 182 are of the same thickness as the remainder of the wing members from which they extend and may be tapered at the free ends thereof. The finger members 180 and 182 extend from the wing members 132 and 134, respectively, in a direction opposite the free ends of the cheveron shaped projections, 136 and 138, respectively.

The one-piece stamped head portion 114 is illustrated in FIG. 11 and is substantially identical to head portion 14 described above except for the provision of slots 184 and 186 which are provided in the attached ends of tabs 146 and 148, respectively. Slots 184 and 186 are each of sufficient size to permit passage of finger members 180 and 182, respectively, therethrough.

The assembled two-piece nail 100 is illustrated in FIG. 12. The finger members 180 and 182 extend through slots 184 and 186, respectively, and will cooperate with the tabs 146 and 148 and the upper surface 124 of the head portion 114 to resist movement of the wing members 132 and 134 relative the head member 114 during driving of the nail assembly 100.

Although the preferred form of the present invention has been illustrated as utilizing two wing members and two tabs, it is understood that any suitable number of wing members and tabs may be utilized departing from the scope of the present invention.

Although this invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

I claim:

1. A sheet metal nail assembly comprising a one-piece shank portion manually self-retainingly assembleable to a generally flat one-piece head portion, said shank portion and said head portion each defining engaging means adapted to be non-threadably self-retainingly interengaged upon a fractional turn rotation of said shank portion relative to said head portion, the engaging means defined by said shank portion comprising a pair of generally coplanar wing members extending in opposite directions from said shank portion, and the engaging means defined by said head portion comprising a pair of generally coplanar tabs extending in opposite directions generally parallel with and spaced from a surface of said head portion, said tabs spaced from said surface by a distance generally equal to or less than the thickness of said wing members, each of said wing members adapted to be received between said surface and one of said tabs, one of each of said wing members and each of said tabs having a projection extending therefrom and the other of each of said wing members and each of said tabs having an aperture formed therein adapted to receive one of said projections, said projections spaced apart by a distance substantially equal to the distance separating said apertures.

2. The sheet metal nail assembly of claim 1 wherein said projections extend from said wing members and the apertures are formed in said tabs.

3. The sheet metal nail assembly of claim 2 wherein said projections are generally chevron shaped slots sheared from said wing members.

4. The sheet metal nail assembly of claim 2 wherein said shank portion comprises a longitudinally extending body having a leading end provided with a point and a remote end from which the wing members extend transversely of said body, said head portion defines an upper surface remote from the leading end of the shank portion and a lower surface, said tabs sheared from said head portion and extending from and generally parallel to said upper surface.

5. The sheet metal nail assembly of claim 4 wherein an opening is formed in said head portion generally intermediate said tabs, said opening of sufficient size to receive said longitudinal body of said shank portion and to permit at least limited rotation of said shank portion within said opening relative to said body but not of sufficient size to allow passage of said wing members therethrough.

6. The sheet metal nail assembly of claim 5 wherein said opening formed in said head portion is of a generally hour glass shape.

7. The sheet metal nail assembly of claim 5 wherein said longitudinally extending body of said shank portion is provided with at least one locking member extending therefrom.

8. The sheet metal nail assembly of claim 1 wherein at least one of said wing members includes a coplanar finger member extending transversely therefrom and at least one of said tabs includes a slot therethrough adjacent the attached end thereof, said slot of sufficient size to permit passage of the free end of the finger member.

9. A two-piece sheet metal nail assembly comprising a one-piece head portion and a one-piece shank portion, said shank portion adapted to be manually non-threadably self-retainingly assembled to said head portion, said shank portion comprising an elongated body having a leading end provided with a point and an opposite end from which a pair of generally coplanar wing members extend outwardly and in generally opposite directions generally transverse to said body, said head portion being generally flat and defining an upper surface remote from said leading end and a lower surface, a pair of generally coplanar tabs extending from and generally parallel to said upper surface, said tabs being spaced from said upper surface by a distance generally equal to the thickness of said wing members, said wing members adapted to be received and retained between said tabs and said upper surface, said head portion provided with an opening therethrough interposed said tabs, said opening of sufficient size to receive said body therein and to permit at least limited rotation of said shank portion relative to said head portion when said shank portion is received in said opening but not of sufficient size to allow passage of said wing members therethrough.

10. The sheet metal nail assembly of claim 9 wherein one of each of said wing members and each of said tabs carries a projection extending therefrom and the other of each of said wing members and each of said tabs has an aperture formed therethrough adapted to receive one of said projections, said projections spaced apart by a distance substantially equal to the distance separating said apertures.

11. The sheet metal nail assembly of claim 10 wherein said projections extend from said wing members in the direction away from said leading end and the apertures are formed in said tabs.

12. The sheet metal nail assembly of claim 11 wherein said elongated body is substantially flat and is provided with at least one locking member adjacent said leading end.

13. A two-piece sheet metal nail assembly comprising a one-piece shank portion and a one-piece head portion, said shank portion adapted to be self-retainingly assembled to said head portion, said shank portion comprising an elongated body having a leading end provided with a point and a trailing end from which at least one wing member extends transversely outwardly, said head portion comprising a substantially flat body defining an upper surface remote from the leading end and a lower surface, at least one tab pressed from said generally flat body and extending from said upper surface, at least a portion of said tab extending generally parallel to said upper surface and spaced from said upper surface by a distance generally equal to the thickness of said wing member, said head portion provided with an opening therethrough of sufficient size to receive the elongated body of said shank portion and to allow at least limited rotation of said shank portion relative to said head portion with said shank portion elongated body received in said opening but not of sufficient size to permit passage of said wing members therethrough whereby said assembly is assembleable by passing said elongated body of said shank portion, leading end first, through said opening, from the upper surface of said body portion, to bring said wing member into contact with said upper surface and then rotating said shank portion a fractional turn relative to said head portion to cause said wing member to be resiliently received and retained between said tab and said upper surface.

14. The two-piece sheet metal nail assembly of claim 13 wherein said shank portion includes at least two generally coplanar wing members extending in opposite directions from said elongated body and generally transversely thereof and said head portion includes at least two generally coplanar tabs extending from said upper surface and in generally opposite directions.

15. The two-piece sheet metal nail assembly of claim 14 wherein one of each of said wing members and each of said tabs carries a projection extending therefrom and the other of each of said wing members and each of said tabs has an aperture formed therein adapted to receive and retain one of said projections, said projections spaced apart by a distance substantially equal to the distance separating said apertures.

16. The two-piece sheet metal nail assembly of claim 15 wherein said projections extend from said wing members in a direction away from said leading end.

17. The two-piece sheet metal nail assembly of claim 16 wherein the free ends of said tabs are flared outwardly from said upper surface whereby relative rotation of said shank portion relative to said head portion will cause said outwardly flared leading ends of said tabs to be engaged by said projections extending from said wing members and as relative rotation continues said tab members will be resiliently cammed outwardly until said projections align with said apertures and said tabs return to the non deformed position entrapping said projections within said apertures to self-lockingly retain said shank portion to said head portion.

18. The two-piece sheet metal nail assembly of claim 17 wherein said elongated body of said shank is generally flat and provided with a generally longitudinally extending rib therein and at least one locking member adjacent said leading end.

19. The two-piece sheet metal nail assembly of claim 17 wherein said generally head portion is provided with at least one rib member pressed therein.

20. The two-piece sheet metal nail assembly of claim 19 wherein said rib member is generally annular.

21. The sheet metal nail assembly of claim 18 wherein said wing members are each provided with a coplanar finger member extending traversely therefrom and said tabs are provided with slots therethrough adjacent the attached ends thereof, said finger members extending through said slots and engaging the upper surface of said head member.

* * * * *